United States Patent
Evans et al.

(10) Patent No.: US 7,149,273 B2
(45) Date of Patent: Dec. 12, 2006

(54) METHOD OF FABRICATING A NUCLEAR REACTOR FUEL ASSEMBLY GRID

(75) Inventors: Paul M. Evans, Lexington, SC (US); Gary C. Crabtree, Columbia, SC (US); Kevin G. Guthrie, Duncansville, PA (US); Phillip L. Hazlett, Columbia, SC (US)

(73) Assignee: Westinghouse Electric Co LLC, Pittsburgh, PA (US)

( * ) Notice: Subject to any disclaimer, the term of this patent is extended or adjusted under 35 U.S.C. 154(b) by 255 days.

(21) Appl. No.: 10/989,625

(22) Filed: Nov. 16, 2004

(65) Prior Publication Data

US 2006/0104403 A1 May 18, 2006

(51) Int. Cl.
*G21C 3/34* (2006.01)
(52) U.S. Cl. ............... 376/438; 376/439; 376/441; 376/442; 376/462
(58) Field of Classification Search ............... 376/219, 376/352, 438, 439, 441–444
See application file for complete search history.

(56) References Cited

U.S. PATENT DOCUMENTS

| | | | |
|---|---|---|---|
| 3,379,617 A | 4/1968 | Andrews et al. | |
| 4,418,036 A | 11/1983 | Gjertsen et al. | |
| 4,521,374 A * | 6/1985 | Duncan | 376/462 |
| 4,522,330 A * | 6/1985 | Kerrey et al. | 228/182 |
| 4,594,216 A * | 6/1986 | Feutrel | 376/442 |
| 4,772,447 A * | 9/1988 | Manson et al. | 376/441 |
| 4,844,858 A | 7/1989 | Fero et al. | |
| 5,068,083 A * | 11/1991 | John et al. | 376/449 |
| 5,303,276 A | 4/1994 | DeMario et al. | |
| 5,859,887 A | 1/1999 | Richards | |
| 6,144,716 A | 11/2000 | Nguyen et al. | |
| 6,522,710 B1 * | 2/2003 | Smith et al. | 376/442 |
| 6,606,369 B1 | 8/2003 | Smith, III et al. | |

FOREIGN PATENT DOCUMENTS

| | | | | |
|---|---|---|---|---|
| GB | 1204657 A * | 9/1970 | | 376/442 |
| GB | 2238902 A * | 6/1991 | | |
| JP | 62287184 A * | 12/1987 | | 376/442 |

OTHER PUBLICATIONS

Newman, B&W aims for 50GWd/tU and more, Nuclear Engineering International, Aug. 1987.*

* cited by examiner

*Primary Examiner*—Jack Keith
*Assistant Examiner*—Daniel Lawson Greene, Jr.

(57) ABSTRACT

A method of fabricating a fuel assembly grid that includes providing a plurality of interconnected straps that form a lattice pattern, wherein the lattice pattern of the straps defines a plurality of cells, providing a sleeve that has a cylindrical portion and a flared portion, and inserting the sleeve into at least one of the cells. When inserted, at least a portion of the cylindrical portion of the sleeve will reside inside the cell and the flared portion will extend above the top end of the cell and overhang the perimeter of the cell. The flared portion is melted and flows over and fuses to the straps that define the cell. The straps may include weld tabs over which the melted material flows and to which it fuses. The melting and fusing steps also preferably cause any loose straps surrounding the cell to become attached to the sleeve.

5 Claims, 3 Drawing Sheets

METHOD OF FABRICATING A NUCLEAR REACTOR FUEL ASSEMBLY GRID

BACKGROUND OF THE INVENTION

1. Field of the Invention

The present invention relates generally to the fabrication of fuel assembly support grids for nuclear reactors, and more particularly to an improved method of fabricating a fuel assembly grid using a flared sleeve.

2. Description of the Related Art

In most pressurized water nuclear reactors, the reactor core is comprised of a large number of elongated fuel assemblies. These fuel assemblies typically include a plurality of fuel rods held in an organized array by a plurality of grids that are spaced axially along the fuel assembly length and are attached to a plurality of elongated thimble tubes of the fuel assembly. The thimble tubes typically receive control rods, plugging devices, or instrumentation therein. Top and bottom nozzles on opposite ends of the fuel assembly are secured to the ends of the thimble tubes that extend slightly above and below the ends of the fuel rods.

The grids, as is known in the relevant art, are used to precisely maintain the spacing between the fuel rods in the reactor core, resist rod vibration, provide lateral support for the fuel rods and, to some extent, vertically restrain the rods against longitudinal movement. The grids are typically made of materials such as stainless steel, Inconel, and alloys of Zirconium. One type of conventional grid design includes a plurality of interleaved straps that together form an egg-crate configuration having a plurality of cells which individually accept the fuel rods therein. Depending upon the configuration of the thimble tubes, the thimble tubes can either be received in cells that are sized the same as those that receive fuel rods therein, or can be received in relatively larger thimble cells defined in the interleaved straps.

The straps are configured such that the cells each include a plurality of relatively compliant springs and a plurality of relatively rigid dimples, with the springs and dimples being formed into the metal of the interleaved straps and protruding outwardly therefrom. The springs and dimples of each cell engage the respective fuel rod extending through the cell. Outer straps of the grid are attached together and peripherally enclose the inner straps of the grid to impart strength and rigidity to the grid.

Because the straps that make up a grid are relatively thin, i.e., on the order of 0.0105 inches in some cases and 0.008 inches in others, they tend to be flexible, making it difficult to securely attach (such as by welding) the lengthy thimble tubes directly to the straps. Instead, it has become common practice to first attach a relatively shorter cylindrical sleeve made of, for example, stainless steel or alloys of Zirconium, to each of the cells of the straps that are to receive a thimble tube by welding the sleeve and straps together. Next, each of the thimble tubes is inserted through the corresponding sleeves and is attached to the sleeves, and thus the grid, by bulging the thimble tubes out at a location either above or below each grid.

FIG. 1 is a partial isometric view of a prior art sleeve 5 attached to the straps 10 of a grid. In prior art grid fabrication methods, sleeve 5 is placed on top of and aligned with cell 15 formed by straps 10. Cell 15 is provided with a generally circular shape for mating with sleeve 5 by providing a radius on straps 10 at that point. Sleeve 5 is then butt welded to straps 10 at butt weld joint 20 shown in FIG. 1. The butt welding of sleeve 5 to straps 10 has proven to be problematic primarily due to the fact that there is normally a gap between sleeve 5 and straps 10 that form cell 15, a condition known as poor sleeve to strap fit-up. This condition is the result of the difficulty in providing cell 15 with a perfectly circular, appropriately sized shape for mating with sleeve 5. This gap makes it difficult to effectively join sleeve 5 and straps 10.

In addition, as is known, the straps, such as straps 10, used to construct fuel assembly grids are elongated sheets of metal. Each sheet is formed with a plurality of parallel slots that extend transversely down approximately one half of the strap. For hexagonally shaped grids made with three sets of interconnected straps, the first set of aligned straps has all of its slots extending downwardly from the top edge of the strap, the second set of straps has all of its slots extending upwardly from the bottom edge of the strap, and the third set of straps has half of its slots extending downwardly from the top edge of the strap and half of its straps extending upwardly from the bottom edge of the strap in an alternating fashion. As is known, this grid is constructed by inserting the slots of certain of the straps into the slots of certain other of the straps to form an interconnecting lattice pattern. The result is a number of what are known as loose straps. Loose straps are the portions of the straps adjacent to each slot which, because of the slot, remain free to move after the straps are interconnected with one another. In order to prevent any potential strap or spring to rod fretting resulting from the movement of the loose straps, the loose straps are fixed in place by attaching them either to the solid portion of an adjacent strap or to a sleeve in the case of loose straps that are positioned adjacent to a sleeve. In the prior art, loose straps are so attached by laser seam welding a weld tab, commonly referred to as a sail, provided on the straps to the adjacent strap or sleeve, as the case may be. This is shown in FIG. 1 at weld seam 25. Again, problems have arisen due to the fact that gaps between each sleeve and the adjacent loose straps make it difficult to effectively join the two materials.

Another problem that exists with prior art sleeves, such as sleeve 5 shown in FIG. 1, and prior art grid fabrication methods is that, due to poor sleeve to strap fit-up, the straps forming a cell for receiving a thimble tube will often encroach on the path of the thimble tube (the straps do not form a perfect circle such that some portions may extend inside the circumference of the sleeve), thus causing difficulty during thimble tube loading. In addition, in the prior art, thimble tube loading has also been adversely impacted as a result of the weld heat affected zone entering the inside diameter of the straps and sleeve, causing the internal diameter thereof to become smaller after grid welding due to the shrinkage of the material in that area.

Thus, there is a need for a grid fabrication method that alleviates sleeve to grid attachment problems and thimble tube loading problems caused by poor sleeve to strap fit-up.

SUMMARY OF THE INVENTION

The present invention relates to a method of fabricating a grid of a fuel assembly of a nuclear reactor. The method includes providing a plurality of interconnected straps that form a lattice pattern. The lattice pattern of the straps defines a plurality of cells. The method further includes providing a sleeve that has a cylindrical portion and a flared portion and inserting the sleeve into at least one of the cells. When inserted in the cell, at least a portion of the cylindrical portion of the sleeve will reside inside the cell and the flared portion will extend above the top end of the cell and overhang a perimeter of the cell. The flared portion is melted and the melted material flows over and fuses to the straps that define the cell. The straps that define the cell may include weld tabs over which the melted material flows and to which it fuses. The melting of the flared portion is done by directing a heat source, preferably a laser beam, at the flared portion. The melting and fusing steps also preferably cause any loose straps surrounding the cell to become attached to the sleeve.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
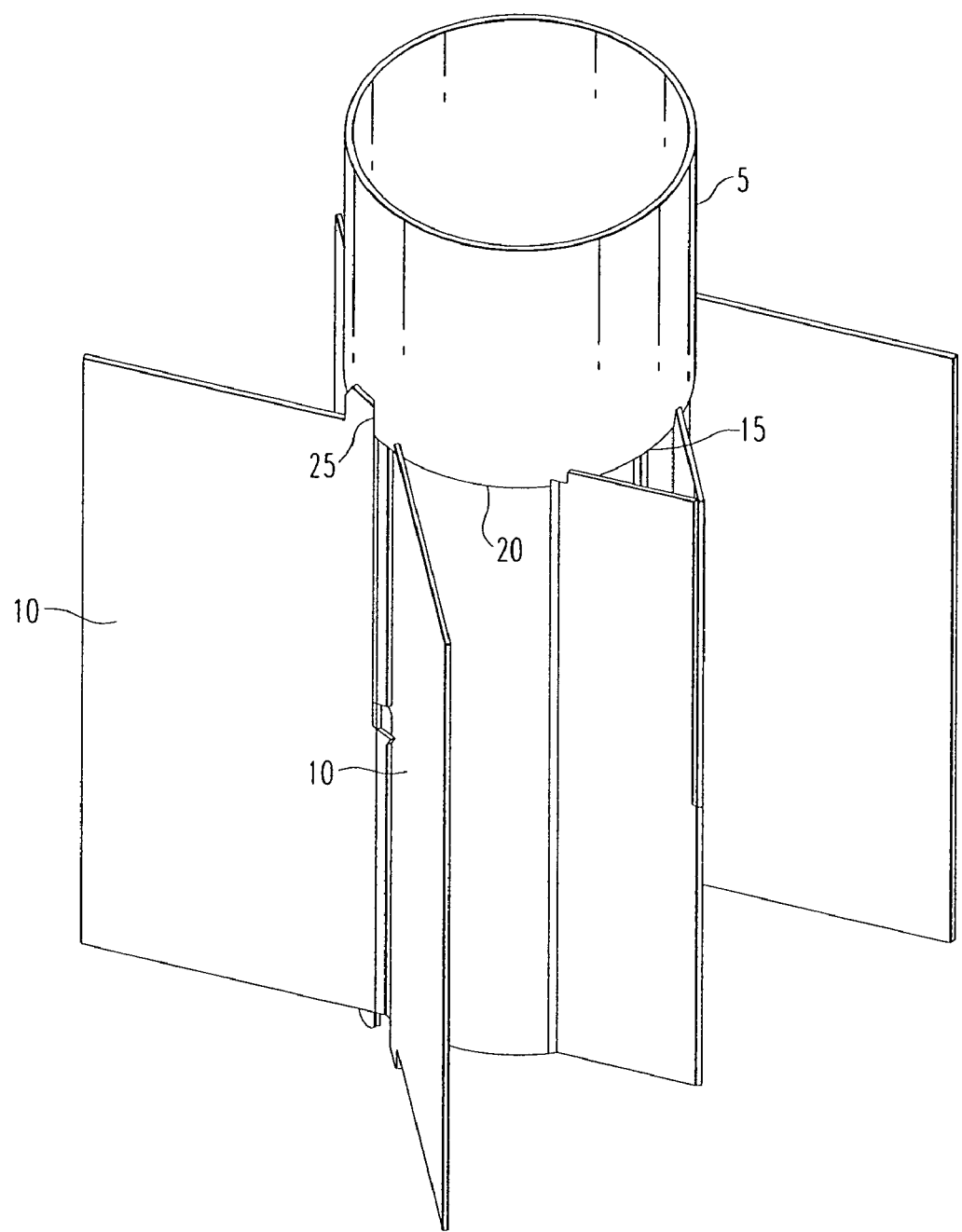
FIG. 1 is an isometric view of a prior art grid having a prior art sleeve attached to a cell defined by a plurality of straps.
Figure 2:
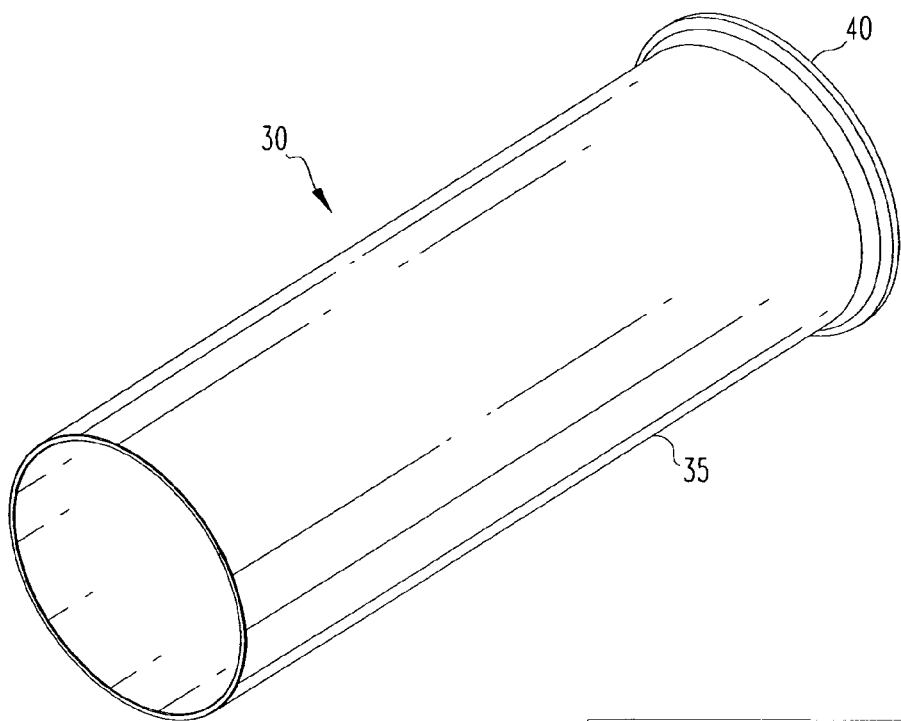
FIG. 2 is an isometric view of a sleeve having a flared portion according to the present invention.
Figure 3:
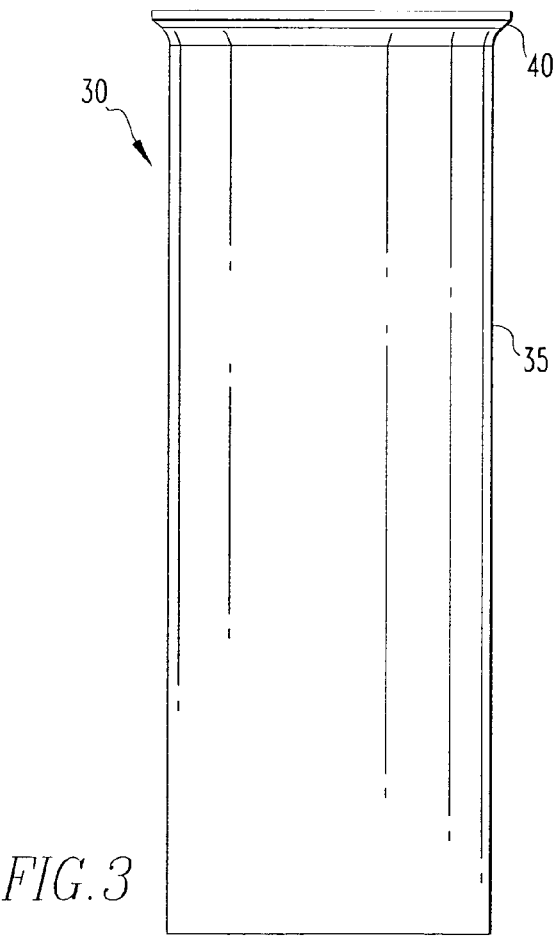
FIG. 3 is a side elevational view of a sleeve having a flared portion according to the present invention.

FIGS. 2 and 3 show isometric and side elevational views, respectively, of sleeve 30 utilized in a grid fabrication process according to the present invention. Sleeve 30 is preferably made of stainless steel or an alloy of Zirconium and includes cylindrical portion 35 at a first end thereof and flared portion 40 at a second end thereof. Flared portion 40 consists of a portion of sleeve 30 that expands outwardly in shape as compared to cylindrical portion 35 such that it has a cross-sectional diameter at any point thereof that is greater than the cross-sectional diameter of cylindrical portion 35. Flared portion 40 may be a portion that gradually increases in diameter from the bottom to the top thereof in a curved fashion as shown in FIGS. 2 and 3. Alternatively, the change in diameter may be abrupt such that flared portion 40 is a larger diameter plate or cylindrical piece that sits directly on top of cylindrical portion 35.

Figure 4:
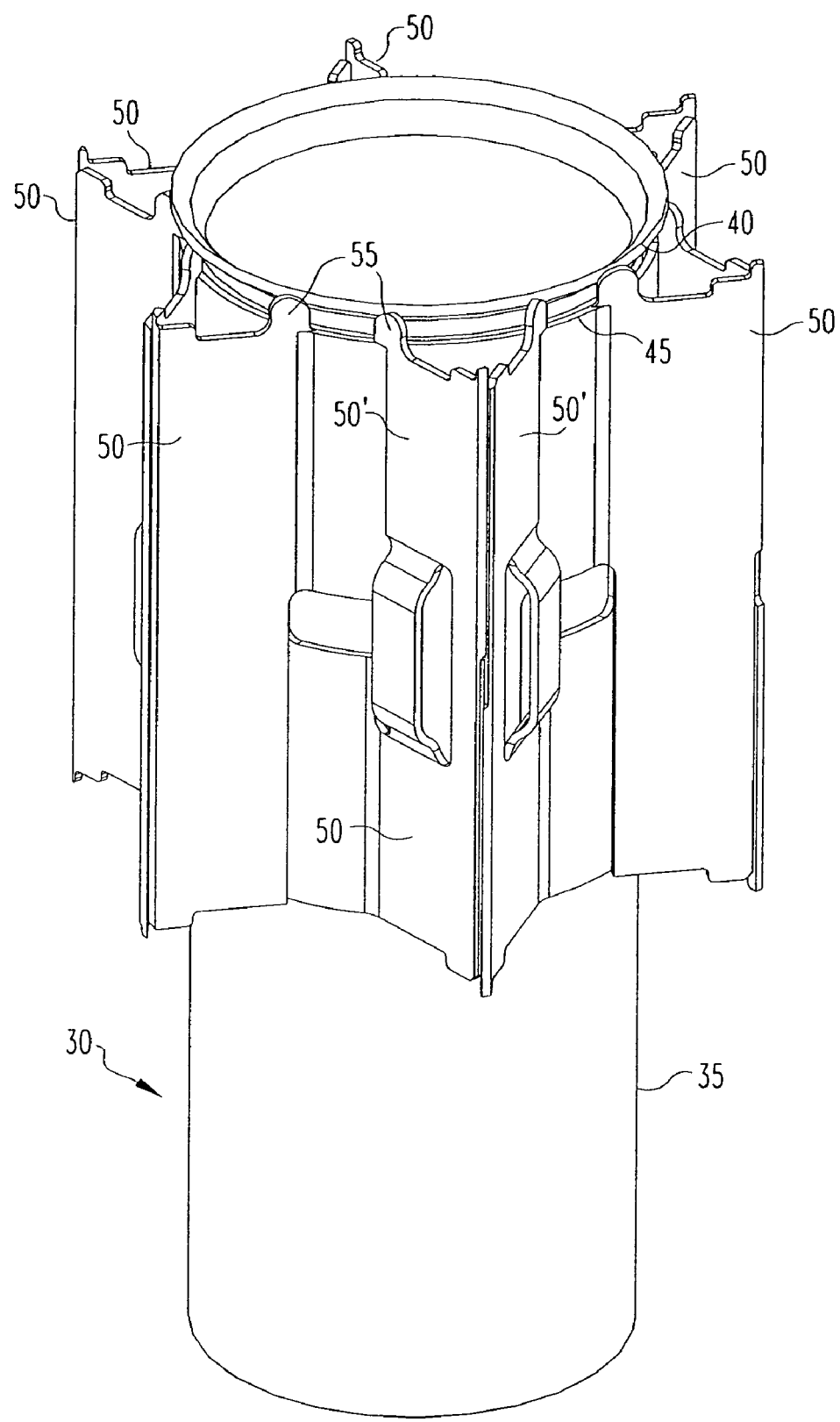
FIG. 4 is an isometric view of a grid constructed using the sleeve shown in FIGS. 2 and 3 according to the present invention.

According to the present invention, sleeve 30 is attached to a grid by first inserting sleeve 30 into cell 45 formed by straps 50 as shown in FIG. 4. As seen in FIG. 4, each of straps 50 preferably includes at least one weld tab 55 such that weld tabs 55 are located at various locations around the perimeter of cell 45. When sleeve 30 is inserted into cell 45, at least a portion of cylindrical portion 35 resides inside cell 45 and flared portion 40 extends above the top end of cell 45 and overhangs the outer perimeter of cell 45, and, preferably, weld tabs 55 such that flared portion 40 is located above weld tabs 55. Next, a heat source, such as a laser beam used in laser seam welding, is directed at flared portion 40, causing the material of flared portion 40 to melt and flow over weld tabs 55 (or alternatively some other portion of straps 50 if weld tabs 55 are omitted) and become fused thereto, thereby connecting sleeve 30 to straps 50 and at the same time attaching the loose straps 50' surrounding cell 45 to sleeve 30 such that they are no longer free to move.

Thus, according to the present invention, a single welding step replaces two separate welding steps (the butt weld and the loose strap to sail weld) of the prior art. In addition, due to the flared nature of flared portion 40 and the fact that it overhangs the outer perimeter of cell 45 and, preferably, weld tabs 55, the attachment step of the present invention compensates for and is not adversely effected by any gaps that are the result of poor sleeve to strap fit-up. Further, because sleeve 30 is inserted into, and preferably entirely through, cell 45, a thimble tube will never come into contact with straps 50 during thimble tube loading (sleeve 30 provides a good interface for the thimble tubes). Finally, because of the flared nature of flared potion 40, the heat affected zone from the welding does not reach the internal diameter of strap 50 or sleeve 30, preventing the shrinkage problem presented by the prior art.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of fabricating a grid of a fuel assembly of a nuclear reactor, comprising:
    providing a plurality of interconnected straps, said straps forming a lattice pattern defining a plurality of cells;
    providing a sleeve, said sleeve having a cylindrical portion and a flared portion;
    inserting said sleeve into one of said cells such that at least a portion of said cylindrical portion resides in said one of said cells and said flared portion extends above a top end of said one of said cells and overhangs a perimeter of said one of said cells; and
    welding said flared portion and causing said weldment flared portion to flow over and fuse to the straps defining said one of said cells.

2. A method according to claim 1, one or more of the straps defining said one of said cells having a weld tab, said welded flared portion flowing over and fusing to said weld tabs.

3. A method according to claim 1, said welding step comprising directing a heat source at said flared portion.

4. A method according to claim 3, said heat source being a laser beam.

5. A method according to claim 1, one or more of the straps defining said one of said cells being loose straps, said welding step attaching said loose straps to said sleeve.

* * * * *